United States Patent
Printezis et al.

(10) Patent No.: US 8,645,651 B2
(45) Date of Patent: Feb. 4, 2014

(54) LOW-CONTENTION UPDATE BUFFER QUEUING FOR SMALL SYSTEMS

(75) Inventors: Antonios Printezis, Burlington, MA (US); Paul H. Hohensee, Nashua, NH (US)

(73) Assignee: Oracle International Corporation, Redwood City, CA (US)

( * ) Notice: Subject to any disclaimer, the term of this patent is extended or adjusted under 35 U.S.C. 154(b) by 1046 days.

(21) Appl. No.: 12/693,815

(22) Filed: Jan. 26, 2010

(65) Prior Publication Data

US 2011/0185144 A1 Jul. 28, 2011

(51) Int. Cl.
  G06F 12/00 (2006.01)
  G06F 12/02 (2006.01)

(52) U.S. Cl.
  CPC ............................... *G06F 12/0253* (2013.01)
  USPC .................................. 711/165; 711/E12.009

(58) Field of Classification Search
  CPC .................................................. G06F 12/0253
  USPC .......................................................... 711/165
  See application file for complete search history.

(56) References Cited

U.S. PATENT DOCUMENTS

| 7,076,578 | B2* | 7/2006 | Poisner et al. ................... 710/52 |
| 8,032,724 | B1* | 10/2011 | Smith ............................ 711/159 |
| 2007/0255909 | A1* | 11/2007 | Gschwind et al. ............. 711/147 |
| 2008/0021939 | A1* | 1/2008 | Dahlstedt et al. ............. 707/206 |

* cited by examiner

*Primary Examiner* — Reginald Bragdon
*Assistant Examiner* — Aracelis Ruiz
(74) *Attorney, Agent, or Firm* — Marsh Fischmann & Breyfogle, LLP; Kent A. Lembke

(57) ABSTRACT

A method for queuing update buffers to enhance garbage collection. The method includes running an application thread and providing, for the application thread, a data structure including current and finished update buffer slots. The method includes providing an update buffer for the application thread and storing a pointer to the update buffer in the current update buffer slot. The method includes storing null in the finished update buffer slot and, with the application thread, writing to the update buffer. The thread may write a pointer to the filled update buffer in the finished update buffer slot after the buffer is filled. The method includes using a garbage collector thread to inspect the finished update buffer slot and claim filled buffers and change the pointer to null. The thread then obtains an empty update buffer and updates the current update buffer slot to point to the new buffer.

16 Claims, 10 Drawing Sheets

LOW-CONTENTION UPDATE BUFFER QUEUING FOR SMALL SYSTEMS

BACKGROUND

1. Field of the Description

The present description relates, in general, to memory management in computer systems and virtual machine environments, including Java™ virtual machines (JVMs), and, more particularly, to methods and systems for providing garbage collection suited for small systems (e.g., with relatively few active application threads such as less than about 100 threads) to reduce contention when accessing update buffers made available by application threads (also known as mutator threads). Generally, though, the method applies to communicating any information from application/mutator threads to garbage collector (GC) threads (e.g., GC threads being a proxy for the GC/memory management subsystem and buffers containing object reference update information providing just one example of such information). The method ensures that the application threads get better latencies, possibly at the expense of the GC threads (e.g., all threads are not treated equally with regard to latency in some embodiments of the described method).

2. Relevant Background

In a computer system, the effective control of the allocation of memory resources is desirable to the successful operation and scalability of the computer system (e.g., the whole hardware stack, operating system (OS), Java™ Virtual Machine (JVM), software, and the like). Software applications run more efficiently in environments in which steps are taken to proactively manage available memory resources to ensure that only those entities or data objects that are currently being used are stored in memory, while unused entities or data objects are cleanly removed. In some systems and virtual machines (for example, the JVM), the system periodically performs garbage collection using one or more garbage collector (GC) threads. During garbage collection, the virtual machine scans the entire data object memory (or application heap) and finds which objects stored in the heap are currently in use and which objects the program can no longer reference. The areas of the heap occupied by unreferenceable objects are then returned to the virtual machine for subsequent use.

Generally, garbage collection (GC) is a form of automatic memory management that frees a programmer from worry about releasing no-longer used memory resources. Typically, garbage collector threads are used in the context of, or in computing environments involving, programming languages that allocate memory as data objects. For example, each application (or its threads) may have a pool of data objects in its heap, and garbage collector threads find out which of these data objects are unreachable and reclaims them. A garbage collector thread consumes finite computing resources performing actions that manage the process of deciding what memory is to be freed and when and how such memory should be made available to an application (or application threads). Hence, a penalty for using garbage collectors is GC-created overhead leading to decreased application processing efficiency. More particularly, in garbage collected runtime environments, it is often the case that mutator threads must notify the garbage collector of updates they perform on object reference fields. This information can be used by the garbage collector in several ways such as to update remembered sets to ensure correct operation of an incremental marking scheme.

There are many ways to record object reference field updates. One technique involves dirtying entries of a card table to notify the garbage collector which areas or "cards" of the heap contain modified objects. In another technique, update buffers are generated that contain information about each update a mutator thread has performed, and garbage collector threads periodically read and process these buffers. In this latter garbage collection approach, the update buffers are typically added by mutator threads to a global queue (or global input buffer queue) and removed from the global queue by garbage collector threads. An atomic operation, such as a lock or compare and swap (CAS) operation, must be used to add and/or remove an update buffer to or from the queue. A point of contention between GC threads may arise as buffers are added and removed from the global queue that limits scalability and performance of the computer systems implementing such a garbage collection process.

Hence, there is a need for improved methods of providing garbage collection with less contention to memory and/or other resources of a computing system. Preferably, such garbage collection methods and systems may provide data structures that cause (or allow) applications to do as little work as possible while causing the garbage collector thread(s) to do more work (e.g., create a desired asymmetry in which garbage collector thread(s) may have more latency than mutator threads).

SUMMARY

Briefly, a technique is provided for providing an effective and efficient garbage-collected runtime environment for small computer systems (i.e., with relatively small numbers of application threads). Each mutator thread uses two slots in a block of memory to which only it has access (this block of memory is often termed Thread Local Storage or TLS) to provide a current update buffer pointer and a finished/filled update buffer pointer. Initially, the current update buffer pointer may reference an empty buffer provided to the thread while the finished buffer pointer may be null. While the mutator thread is running, it writes update information to the current buffer and when full, it verifies the finished buffer pointer is null and then stores the reference to the filled update buffer in the finished buffer pointer. The thread then obtains a new buffer to update. A garbage collector (GC) thread periodically checks the finished buffer pointer for a non-null value, which indicates that a buffer is available for processing. A GC thread periodically walks a list of mutator thread TLS blocks to find filled buffers to process. There can be more than one GC thread walking the TLS block list at once.

When found, the GC thread atomically claims the buffer and writes null to the finished slot and then processes the buffer. If a GC thread has not claimed a filled buffer by the time the mutator thread fills a next update buffer, the mutator thread will find that the finished buffer slot is not null and will respond by making the filled buffer available on a global queue instead. The GC thread(s) act periodically to check for work on the global queue, and, when found, to claim the buffers via atomic operations. In this manner, contention for memory resources such as buffers and the global queue is significantly reduced for small computer systems incorporating this method and/or system. Contention is reduced because the contended access on the global queue is reduced in favor of less contended access on the thread-local fields.

The method and techniques described are particularly well suited for small systems (i.e., systems with a small number of mutator threads). One reason is that when a GC thread walks the list of mutator TLSs, it will more than likely cause a data cache miss whenever it first accesses the finished buffer slot. The data cache miss will provoke a memory access to fetch the contents of the finished buffer slot, which can take a significant amount of time. If there are a large number of mutator threads, there will be many such data cache misses, which in turn will increase GC overhead, which will slow down overall application execution. If, on the other hand, there is a relatively small number of mutator threads (such as less than about 100 threads), the data cache miss overhead will be small. The method is also suited for small systems because iterating over all application threads to find non-null entries in their "finished" field may not scale well if there are many application threads because the GC threads will have to check all application threads again and again to find available buffers. Generally, though, the method applies to communicating any information from application/mutator threads to GC threads (e.g., GC threads being a proxy for the GC/memory management subsystem and buffers containing object reference update information providing just one example of such information). The method ensures that the application threads get better latencies, possibly at the expense of the GC threads (e.g., all threads are not treated equally with regard to latency in some embodiments of the described method).

More particularly, a method is provided for queuing update buffers to enhance garbage collection in a computer system, e.g., by reducing contention problems between the application and GC threads. The method includes running a mutator thread in memory of the computer system and providing, for the mutator thread, a data structure including a current update buffer slot and a finished update buffer slot. The method further includes providing an update buffer in the memory for the mutator thread and storing a pointer to the update buffer in the current update buffer slot. The method includes storing null in the finished update buffer slot and with the mutator thread, writing to the update buffer. Then, after the writing fills the update buffer, writing the pointer to the filled update buffer to the finished update buffer slot.

The method may further include using a garbage collector thread to inspect the finished update buffer slot and claiming the filled update buffer for processing. In some cases, the claiming step is performed with an atomic operation and may include changing the finished update buffer slot to null. The method may further include obtaining an empty update buffer and updating the current update buffer slot to have a pointer to the obtained, empty update buffer. The method may also include (after the obtaining) filling the obtained update buffer with data from the application thread and, when the finished update buffer slot is not null (i.e., is determined to contain the pointer to the filled update buffer by the mutator thread), adding the obtained update buffer to a global queue of the computer system. The method may also further include, with a garbage collector thread, determining the obtained update buffer is available in the global queue and, in response, claiming the obtained update buffer from the global queue with the garbage collector thread using an atomic operation. Additionally, the method may involve the mutator thread obtaining an additional, empty update buffer and writing a pointer to the additional, empty update buffer to the current update buffer slot.

DETAILED DESCRIPTION

Briefly, the following description is directed to methods and systems for providing garbage collection with low-contention update buffering, which may be particularly well-suited to computer systems with a relatively small number of threads and/or that may be footprint restricted. As will become clear, the methods and systems provide a number of useful advantages. For example, the described low-contention update buffering for application threads reduces synchronization contention by minimizing the use of a global queue, which is accessed by application/mutator threads to add entries and from which all garbage collector (GC) threads remove entries. To reduce applications' access of the global queue, most of the time, update buffers are provided to or made available on each thread's "finished" slot of their thread data structure (e.g., a thread-local storage (TLS) structure in local or otherwise accessible memory). Only one application/mutator thread adds update buffers to such a finished slot of a thread data structure but, typically, all GC threads act to remove filled buffers. Typically, a smaller number of GC threads is provided in a computer system implementing the described methods such that little or no contention arises due to two or more GC threads concurrently attempting to remove a buffer from a particular finished slot of a thread data structure.

Figure 1:
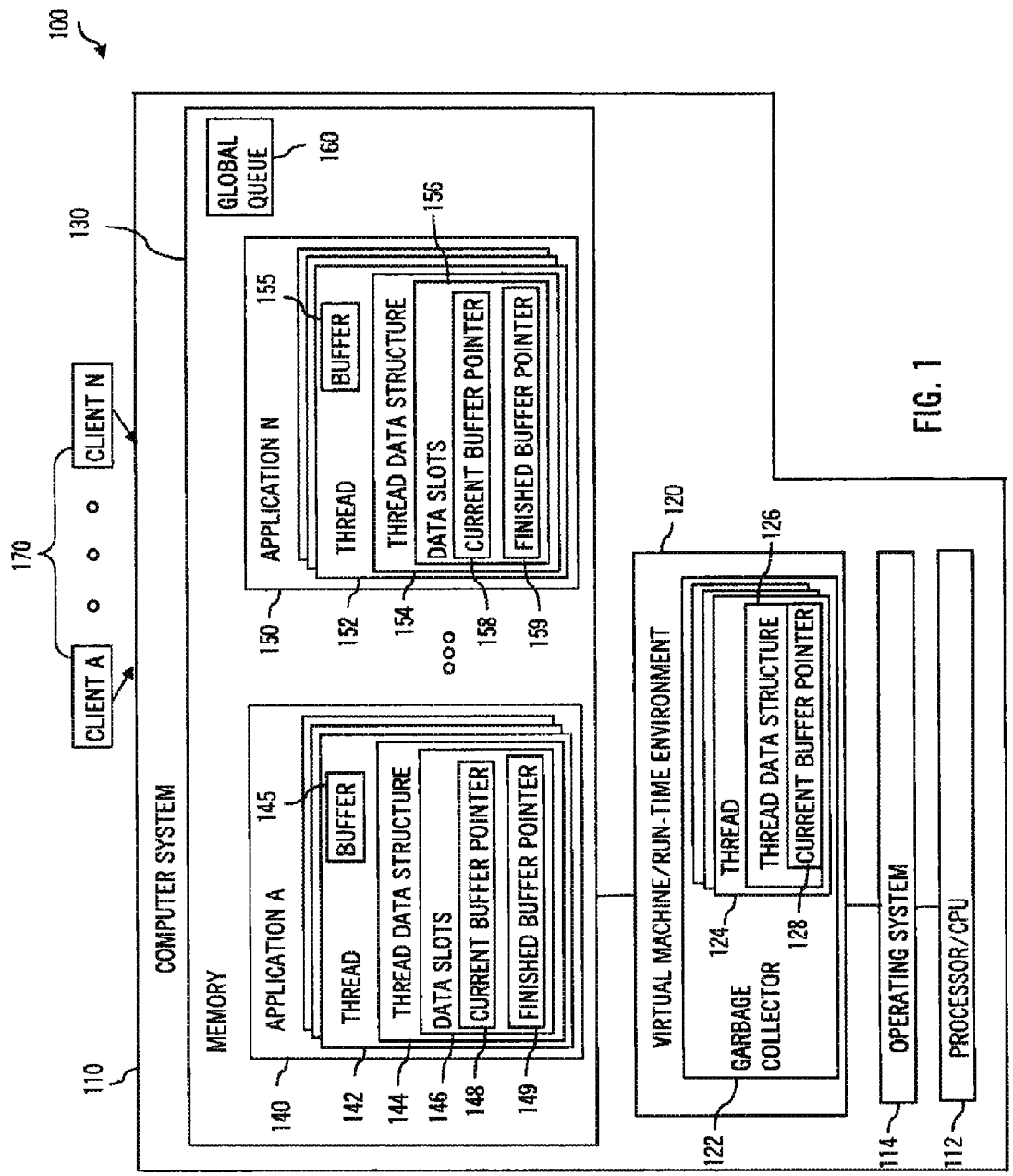
FIG. 1 is a functional block diagram of computing environment with a computer system adapted according to an embodiment to implement garbage collection processes with reduced contention.

FIG. 1 illustrates a computing environment 100 in which low-contention update buffering may be used to enhance garbage collection and reduce contention for memory resources for running applications. The environment is shown to include a computer system 110 that may facilitate implementation of the update buffering within an application server environment 100, for example, to optimize the application server (not shown but may be provided in system 110) and the applications 140, 150 running thereon.

As shown, the computer system 110 includes one or more processors (or central processing units (CPUs)) 112 that run an operating system 114 and manage memory 130. A virtual machine 120, e.g., a JVM or runtime environment or the like, operates upon the operating system 114. Applications 140 to 150 execute within the memory 130 of the system 110, where they may be accessed by clients 170. A garbage collector 122 in accordance with an embodiment described herein is used in conjunction with the virtual machine 120 to garbage collect the memory 130 in accordance with the garbage collection including update buffer queuing techniques described herein. The garbage collector 122 may have one or more active GC threads 124 that are used to process the memory 130 (e.g., to cycle through the thread data structures 144, 154 for non-null finished buffer pointers 149, 159 to a global queue 160), and each GC thread 124 may be provided a thread data structure 126 (e.g., a TLS structure or the like) that includes a slot 128 containing a current buffer pointer or reference field pointing to a current buffer being processed by the GC thread 124.

Each of the applications 140 to 150 may have one or more threads 142, 152. According to an embodiment described herein, each of these threads 142, 152 is provided a thread data structure 144, 154 with a number of data slots 146, 156. Two of these slots are used as part of the update buffering technique, and, specifically, a current buffer pointer is provided in one slot 148, 158 while a finished buffer pointer is provided in a second slot 149, 159. These fields are initially null and later are used to store a pointer to an update buffer 145, 155 provided or used by each thread 142, 152. Further, the computer system memory 130 may include a global queue 160 to which a buffer 145, 155 may be added by the thread 142, 152 when it is finished for collection/removal by a thread 124 of the garbage collector 122.

Figure 2:
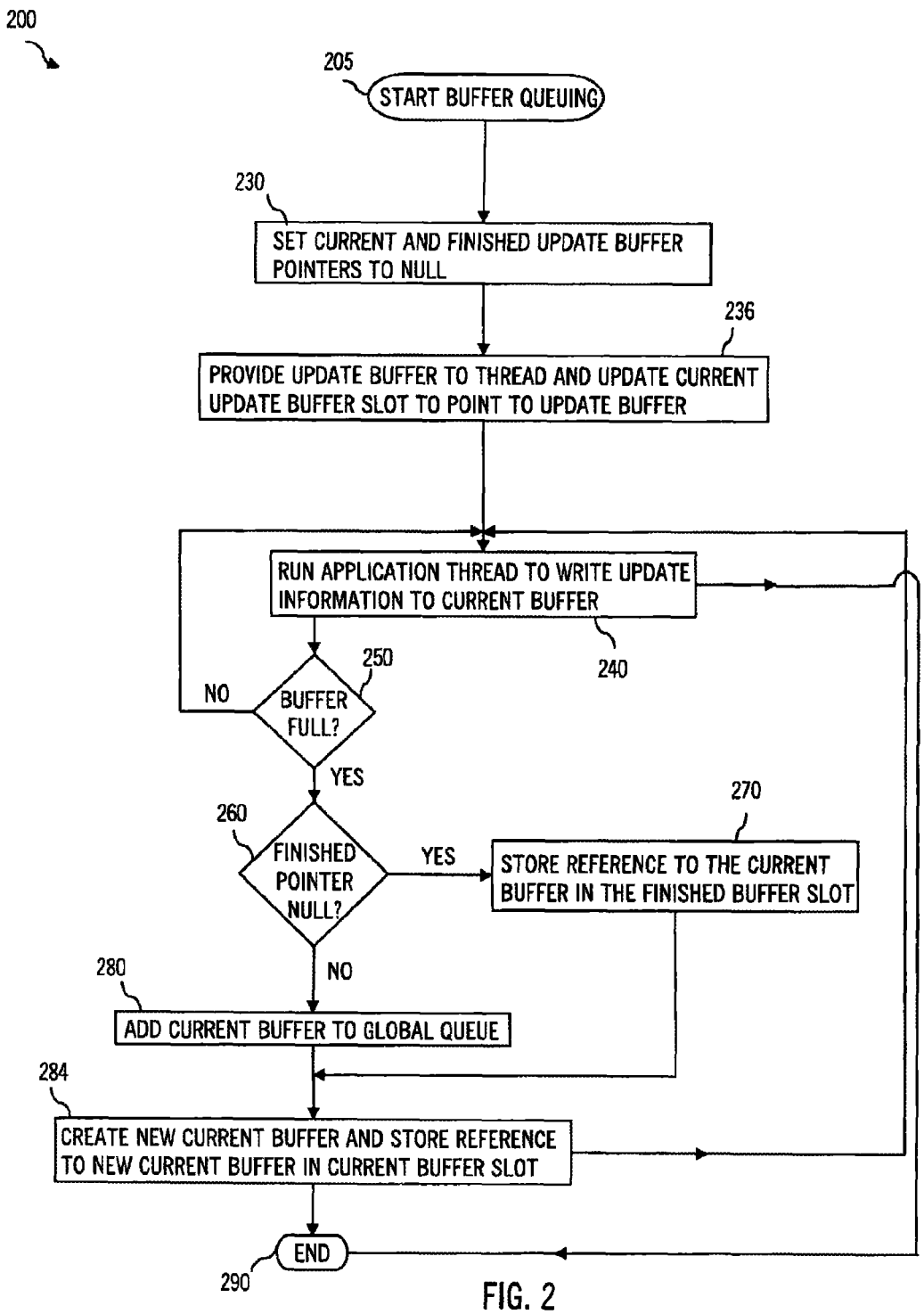
FIG. 2 is a flow diagram of an update buffer queuing method as may be carried out by one or more producer threads (e.g., application threads, mutator threads, or the like) while running in a computer system memory.
Figure 3:
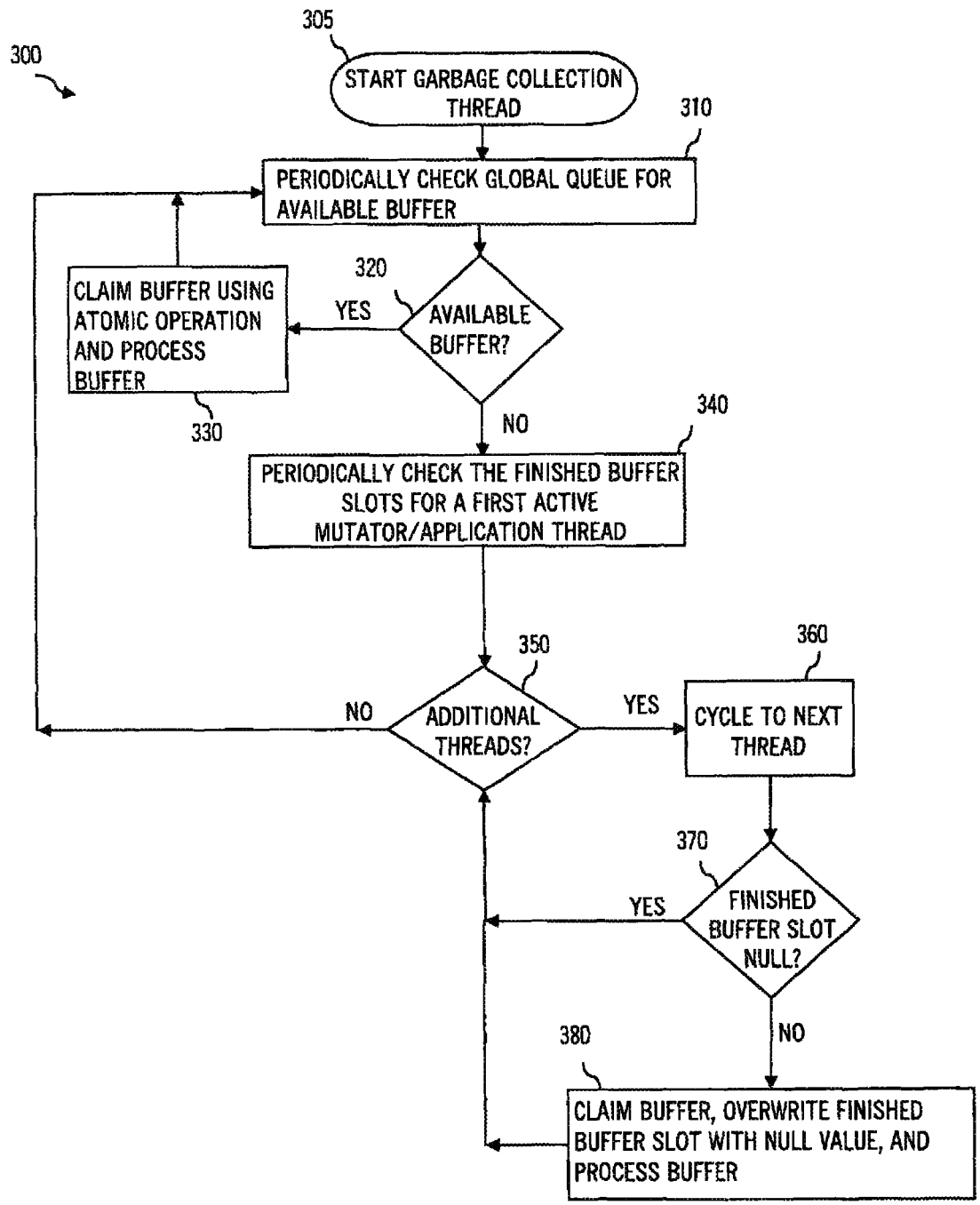
FIG. 3 is a flow diagram of a garbage collection method as may be carried out by one or more threads of a garbage collector in a virtual machine/run-time environment concurrently or as part of the update buffer queuing method shown in FIG. 2.
Figure 4:
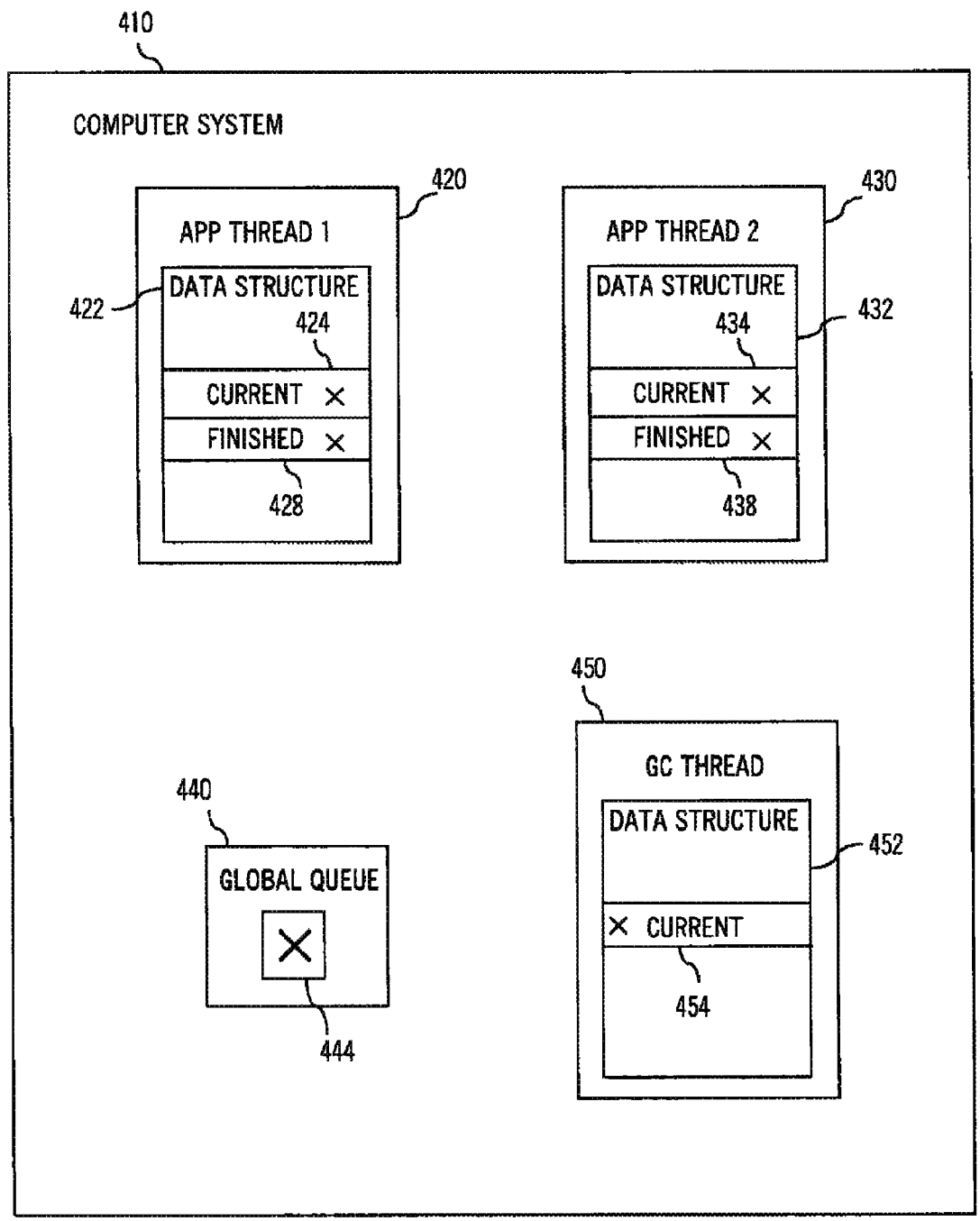
FIGS. 4-10 illustrate schematically update buffer queuing and garbage collection processes during operation of a representative small computer system (e.g., during operation of the computer system of FIG. 1 to perform the methods of FIGS. 2 and 3 or the like).

At this point, it may be useful to describe the operation of the system 110 to provide both update buffer queuing and garbage collection with limited or reduced contention. Specifically, FIG. 2 illustrates an update buffer queuing method 200 that may be performed by the threads 142, 152 of applications 140, 150 during operation of the system 110 while FIG. 3 illustrates garbage collection 300 as may be performed by one of the GC thread(s) 124 of garbage collector 122 (or flow of a GC thread 124). The update buffer queuing method 200 starts at 205 such as by configuring applications to perform the update buffer queuing steps and/or to provide a data structure (such as TLS structure) and an update buffer associated with its threads (e.g., each thread defines its data structure according to the method 200 and creates and references buffers as described herein).

At or during compilation, each mutator thread 142, 152 created for an application 140, 150 within the computer system 110 is provided with a thread data structure 144, 154 in memory 130 (or, in some cases, a subset of the applications 140, 150 have such threads or a subset of an application's threads may implement update buffer queuing as shown herein). Each mutator thread 142, 152 has two slots in its thread structure 144, 154 (such as TLS in memory 130 or any other data structure the thread 142, 152 can access (e.g., efficiently)) assigned as a current update buffer slot 148, 158 and as a finished update buffer slot 149, 159.

At 230 (or in the beginning of running the thread 142, 152), the current buffer and finished buffers may be set to null. Next at 236, an update buffer 145, 155 is provided to the thread 142, 152 and the current update buffer is updated to point (or provide a reference) to the buffer 145, 155 (which is initially empty). In other cases, step 230 may involve using the current update buffer slot to point initially at the empty buffer provided to the thread.

At 240, the mutator thread 142, 152 is run in memory 130 and writes updates or update information to the current buffer 145, 155. At 250, the mutator thread 142, 152 checks whether the current buffer 145, 155 is full, and, if not, the method 200 continues at 240. If the current buffer 145, 155 is full at 250, the method 200 continues at 260 with the mutator thread 142, 152 checking or determining whether the finished buffer pointer in the slot 149, 159 is null. If yes, the method 200 continues at 270 with the thread 142, 152 storing a reference to the current buffer 145, 155 in the finished buffer slot 149, 159 and the method 200 continues at 284. No synchronization is necessary at 270 because no other thread will try to write to that slot 149, 159 while it is null.

If the finished buffer slot 149, 159 is not null at 260, this means that a GC thread has not yet picked up that buffer 145, 155 for processing. In this case, the method 200 continues at 280 with the current buffer 145, 155 being added by the application thread 142, 152 to the global queue. This step 280 may be performed using an atomic operation such as a lock.

After step 270 or 280, the method 200 may continue at 284 with the thread 142, 152 creating a new current buffer 145, 155 and then carrying on the method 200 at 240 with additional update information written to the buffer as needed (or the method 200 may end at 290 after this or any other step of method 200).

While the threads 142, 152 are performing the update buffer queuing 200, garbage collection 300 may be performed by the threads 124 of the garbage collector 122. Garbage collection 300 (or GC thread flow) may start at 305 such as by providing a garbage collector 122 in the virtual machine or run-time environment 120 of the computer system 110 that is adapted or configured (e.g., with code devices) to provide the steps of method 300. One or more GC threads 124 are provided in the virtual machine 120.

The method or GC thread flow 300 may include at 310 a GC thread 124 acting to periodically check the global queue 160 for a buffer available for processing. Specifically, at 320, the GC thread 124 determines whether any work or buffers are available at the global queue 160 and, if not, the method 300 may continue at 340 by starting iteration over application threads. If a buffer 145, 155 has been made available by a mutator thread 142, 152, the method 300 continues at 330 with the checking GC thread 124 claiming the buffer 145, 155 such as with an atomic operation (e.g., a lock, a CAS, or the like) and processing the buffer to empty it or make this resource available for use by other threads 142, 152. The method 300 then continues at 310.

When no buffer is available at 320, the method 300 continues at 340 with the start of iteration over application threads. As shown at 340, the GC thread 126 may periodically (such as offset start times from each other or by starting on different ones of the thread structures 144, 154) check the finished buffer slots 149, 159 for a first active mutator thread 144, 154. At 350, the method 300 continues with determining whether there are additional threads/structures available to inspect, and, if so, cycling to the next thread/structure at 360 and inspecting the next thread/structure's finished buffer slot pointer. If no threads are available at 350, the thread iteration is finished and the flow 300 continues at 310.

At 370, the GC thread 124 determines whether the presently inspected finished buffer slot is null. If yes, the method 300 continues at 350 with determining whether additional threads are available and then, if yes, cycling at 360 through another periodic inspection of thread finished buffer slots. If at 370, a GC thread 124 notices that one of the finished buffer slots is not null, the GC thread 124 attempts at 380 to claim the buffer 145, 155, then overwrite the finished buffer slot with null, and process the buffer. Typically, the step 380 is performed by one of the GC threads 124 using an atomic operation to make sure that no other GC thread 124 claims the buffer 145, 155 at the same time. For example, a CAS (and typically not a lock) may be appropriate for step 380 as there will not be a large amount of contention among threads. After step 380 is complete, the method 300 may continue with looking for additional available threads at 350.

A number of modifications to the methods 200 and 300 and system 110 may be utilized to practice update buffer queuing and garbage collection according to this description. For example, one extension may be to have more than one finished buffer slot per application/mutator thread in its TLS or other thread data structure 144, 154. In this way, each thread 142, 152 may make more than one update buffer available for processing by a GC thread 124 without accessing the global queue 160. In another extension or modification, each of the GC threads 124 may be assigned a particular subset of the application threads 142, 152 to process so that contention is further minimized or controlled. In another implementation, a GC thread(s) may operate under different processing frequencies for differing ones (sets) of the mutator threads 142 to 152 so as to concentrate garbage collection on particular applications (or mutator threads within an application) such as ones that are more active or fill update buffers more frequently.

With the system 110 and methods 200 and 300 understood, it may be useful to further explain the update buffer queuing and garbage collection techniques with reference to operation of a relatively simplistic computer system 410 with reference to FIGS. 4-10. As shown in an initial state in FIG. 4, the computer system 410 includes in its memory first and second application threads 420, 430, with each thread being provided a data structure 422, 432 (such as a TLS structure or the like) and each includes a current buffer point or reference slot 424, 434 and a finished buffer slot 428, 438. The use of an "X" symbol denotes or indicates that the pointer/reference value is null at that point in the operation of the system 410. The computer system 410 also includes a GC thread 450 with a data structure 452 that includes a current buffer slot 454 that points to the buffer that is presently being processed by the GC thread 450 (which is initially null or no buffer is being processed). The computer system 410 also includes a global queue 440 with a field 444 pointing to none ("null" as shown), one, or more buffers that have been made available for garbage collection or processing by the GC thread 450.

Figure 5:
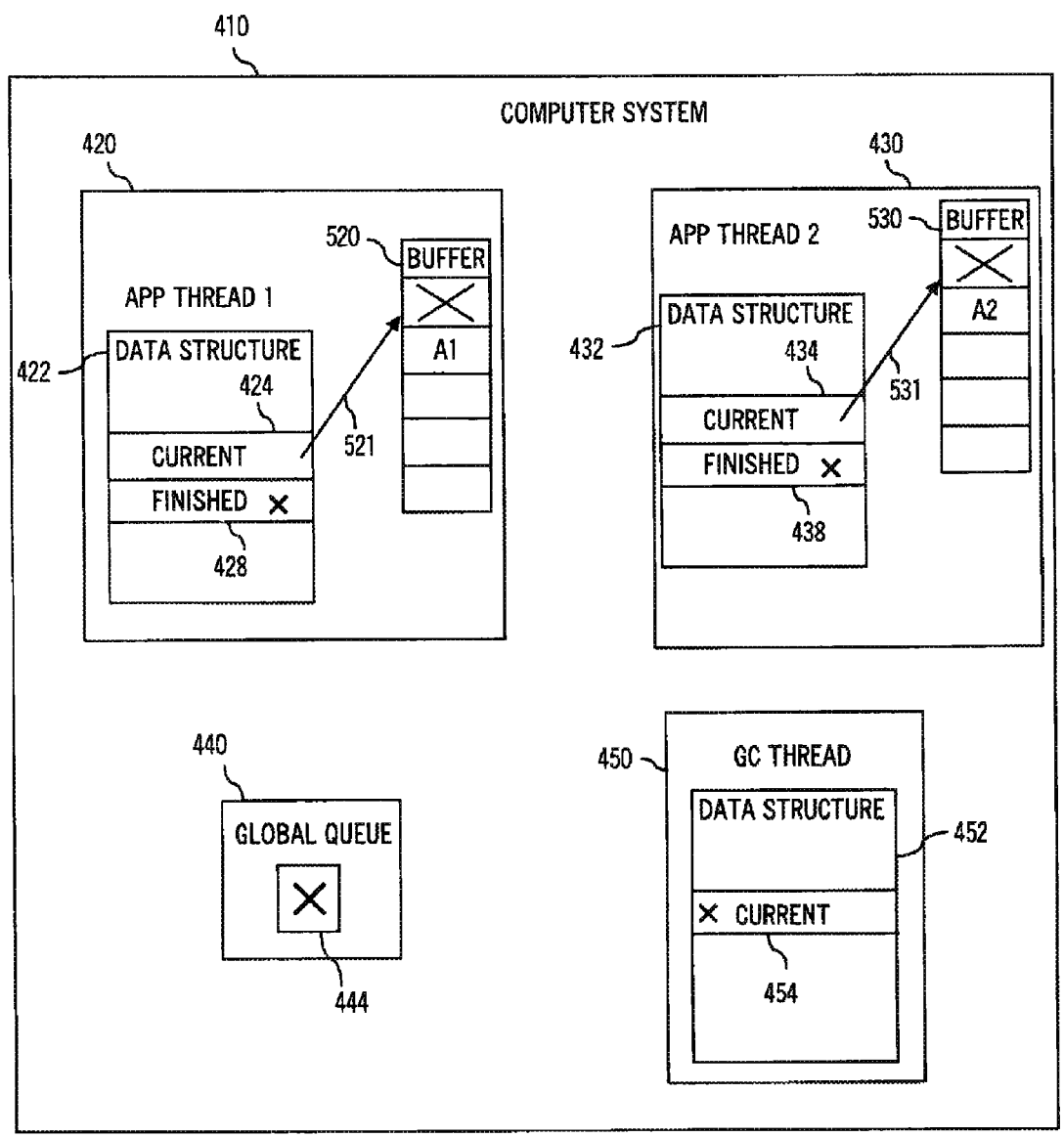
Figure 6:
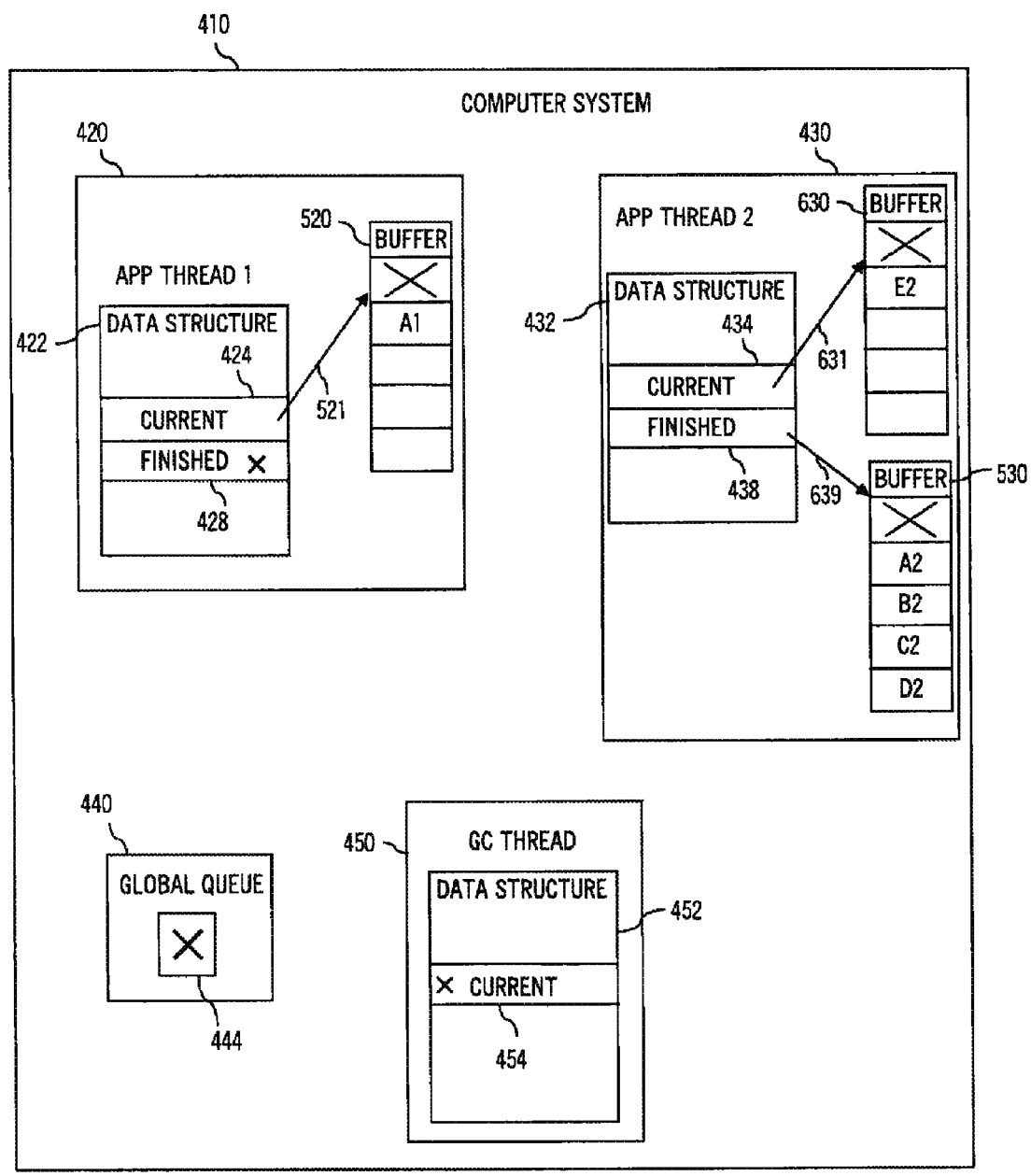

In the operational state shown in FIG. 5, the computer system 410 is being operated with both application threads 420, 430 being provided an update buffer 520, 530. The threads 420, 430 are beginning to fill these buffers 520, 530 with update information (with update information being represented with, A2, and the like in the figure), and the current update buffer slots 424, 434 have been updated to provide a pointer/reference 521, 531 to these presently in use (and not yet full) update buffers 520, 530. In the operational state shown in FIG. 6, the computer system 410 is being operated such that the second application thread 430 has filled up its initial update buffer 530. The thread 430 copies it to the finished buffer slot 438 in its thread structure 432 as shown with pointer/reference 639. No synchronization is necessary, and the thread 430 gets a new update buffer 630 which it references via pointer value 631 provided in the current update buffer slot 434. Hence, the finished buffer slot 438 is no longer null but, instead, contains work or a buffer for the GC thread 450.

Figure 7:
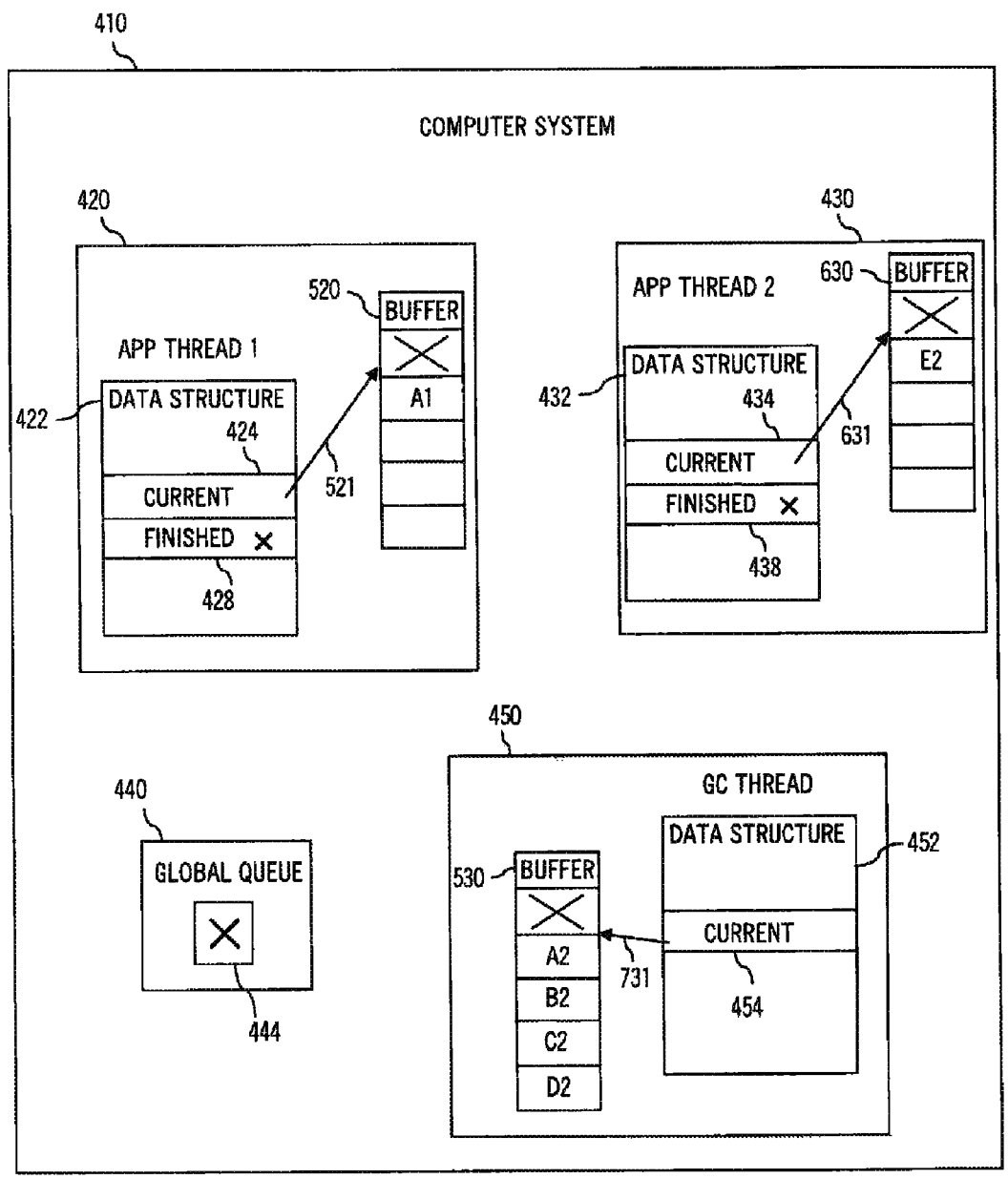
Figure 8:
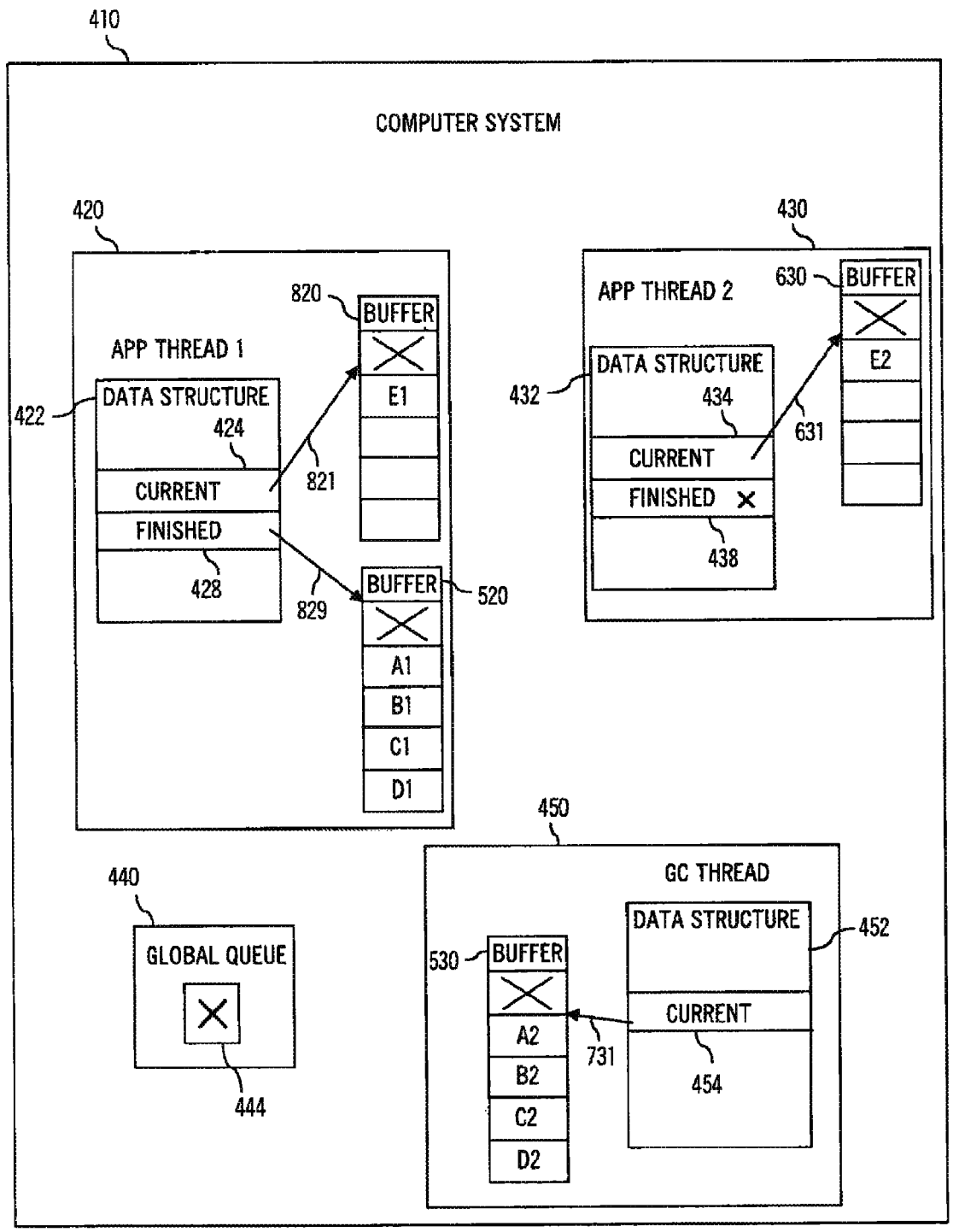

In the operational state shown in FIG. 7, the computer system 410 is operated with the GC thread 450 checking the finished update buffer slot 438 of thread 430, finding it to be non-null, and getting the filled update buffer 530 (e.g., with an atomic operation like CAS). The GC thread 450 starts processing the buffer 530 as is indicated by its update of the currently processed buffer slot 454 of thread structure 452 with a pointer/reference 731 to the buffer 530. In the operational state shown in FIG. 8, the processing by the GC thread 450 of the buffer 530 continues. Additionally, the first application thread 420 has filled up its initial update buffer 520 and copies a pointer 829 to the buffer 520 into the finished buffer slot 428 of structure 422 (no synchronization necessary). The first application thread 420 then obtains a new update buffer 820 and provides a pointer/reference 821 to this buffer 820 in its current update buffer slot 424 of its thread structure 422.

Figure 9:
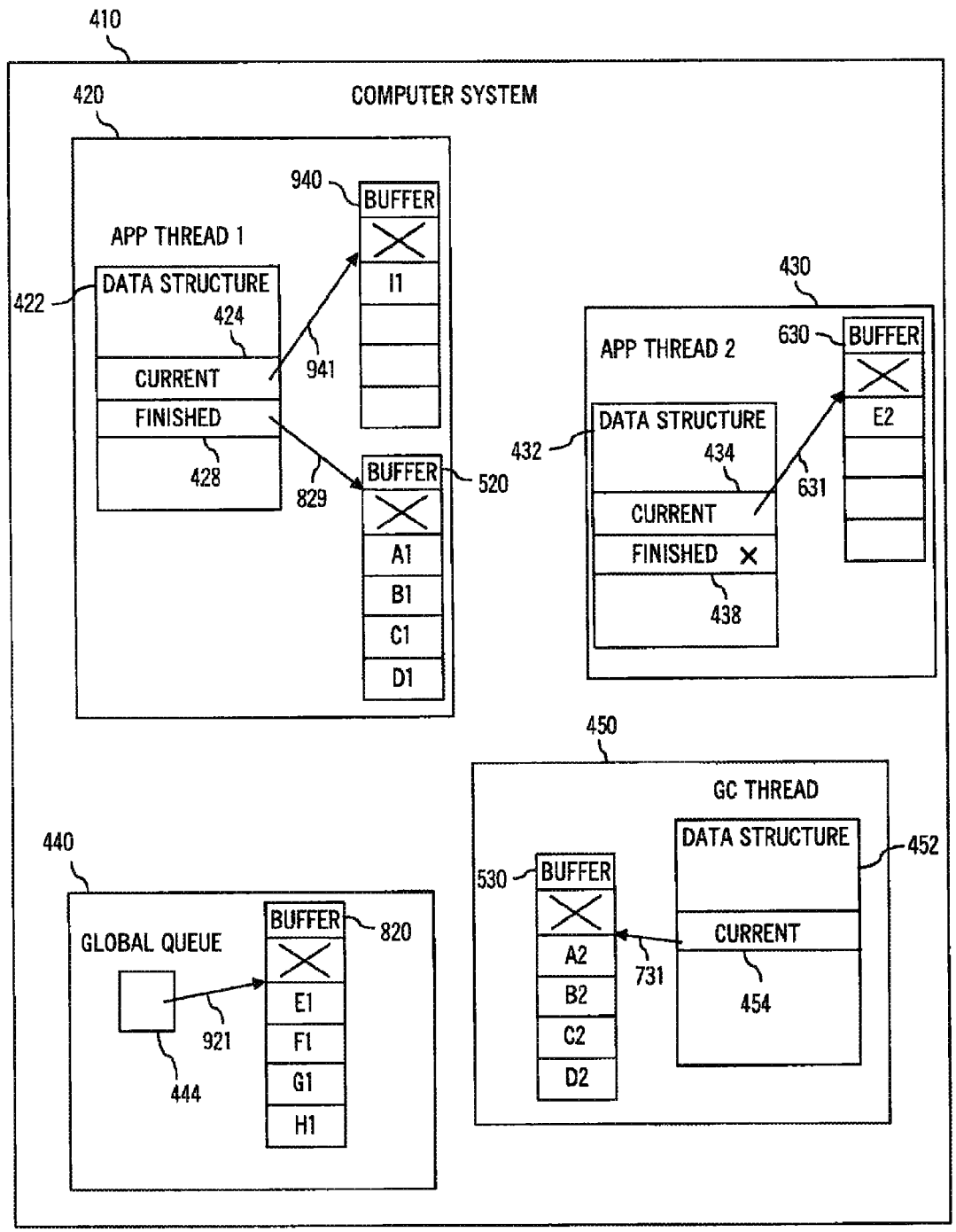

In the operation state shown in FIG. 9 of the computer system 410, the processing by GC thread 450 of buffer 530 continues, and the first application has filled its second/next update buffer 820. The first application thread 420 has checked its finished buffer slot 428 and found it not null (instead, a pointer 829 to buffer 520 is found). In other words, the GC thread 450 was busy processing the buffer 530 and was not able to claim and process the buffer 520, yet. In response, the first application thread 420 has functioned to make its newly filled buffer 820 available on the global queue 440 with a lock or other atomic operation and providing a reference 921 to the filled update buffer 820. The first application thread 420 then acts to get a new update buffer 940 and provides a pointer/reference 941 to this buffer 940 in the current update buffer slot 424 of its thread structure 422. Note, alternatively, the first application thread 420 could have transferred the full buffer 520 to the global queue instead of the full buffer 820, set its finished buffer slot 428 to point to buffer 820, and then continued processing with new buffer 940. Doing so may make the contents of buffer 520 available to the garbage collection sooner than the contents of buffer 820, which may or may not improve the performance of the garbage collection system.

Figure 10:
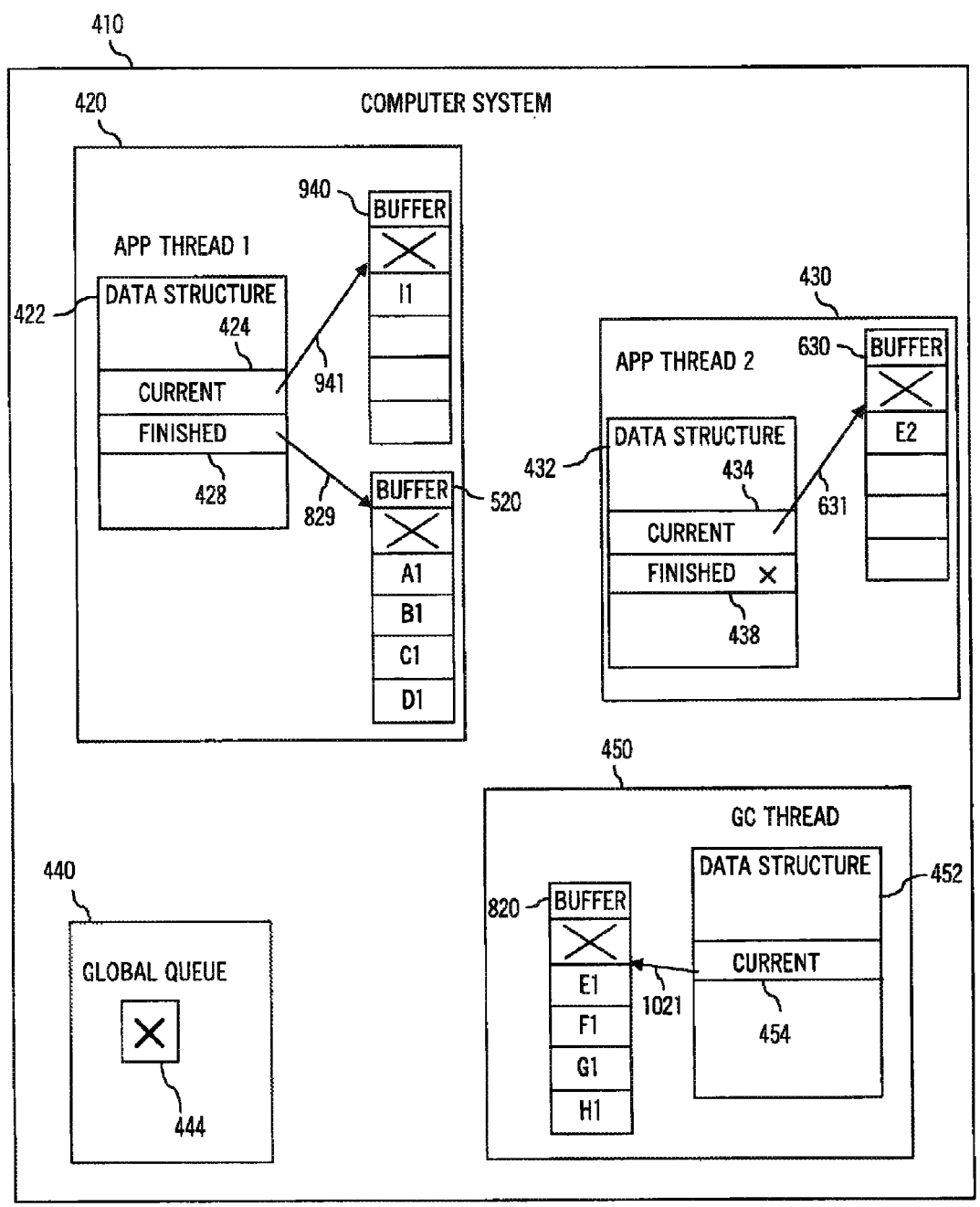

In the operation state shown in FIG. 10, the computer system 410 is being operated after a point in which the GC thread 450 has finished processing the previously claimed update buffer 530 from the second application thread 430. At this point, the GC thread 450 has acted to determine that there was work available on the global queue 440 and has claimed this buffer 820 from the global queue (e.g., with a lock or other atomic operation) and updated the structure 444 of the global queue 440 to null. The data structure 452 of the GC thread 450 is updated such that its current buffer slot 454 has a pointer/reference 1021 to the buffer 820 claimed from the global queue 440. The GC thread 450 then acts to process the buffer 820 to make it (or its associated resources) available to the system 410. In other cases, the GC thread 450 may have acted to claim the buffer 520, based on inspection of the finished buffer slot 428 of the first application thread 420, prior to processing the buffer 820 (or another GC thread may have claimed one of the buffers 520, 820).

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed. The thread structures providing the current update buffer and finished buffer slots may be provided using thread-local storage (TLS), which uses static or global memory local to a thread, but this is not required as nearly efficiently accessible data structure may be used to store the references to current and filled/finished buffers. The update buffer queuing and garbage collection techniques are particularly well suited to computer systems that allocate memory as objects for example that provide a run-time environment such as a Java™ Virtual Machine (JVM), but this is not required to implement the methods and systems taught herein.

Embodiments of the subject matter described in this specification can be implemented as one or more computer program products, i.e., one or more modules of computer program instructions encoded on a computer-readable medium for execution by, or to control the operation of, data processing apparatus. For example, the modules used to provide the applications 140, 150 and garbage collector 122 and the like may be provided in such computer-readable medium and executed by a processor or the like. The computer-readable medium can be a machine-readable storage device, a machine-readable storage substrate, a memory device, a composition of matter affecting a machine-readable propagated signal, or a combination of one or more of them. The term computer system that uses/provides the update buffer queuing and garbage collection method/processes encompasses all apparatus, devices, and machines for processing data, including by way of example a programmable processor, a computer, or multiple processors or computers. The system (such as systems 110 and 410 of FIGS. 1 and 4-10) can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) used to provide the functionality described herein (such as to update buffer queuing and garbage collection) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit). Processors suitable for the execution of a computer program include, by way of example, both general and special purpose microprocessors, and any one or more processors of any kind of digital computer. Generally, a processor will receive instructions and data from a read-only memory or a random access memory or both. Generally, the elements of a computer are a processor for performing instructions and one or more memory devices for storing instructions and data. The techniques described herein may be implemented by a computer system configured to provide the functionality described.

For example, FIG. 1 is a block diagram illustrating one embodiment of a computer system 110 configured to implement the methods described herein. In different embodiments, computer system 110 may be any of various types of devices, including, but not limited to a personal computer system, desktop computer, laptop, notebook, or netbook computer, mainframe computer system, handheld computer, workstation, network computer, application server, storage device, a consumer electronics device such as a camera, camcorder, set top box, mobile device, video game console, handheld video game device, a peripheral device such as a switch, modem, router, or, in general, any type of computing or electronic device.

Typically, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, a digital camera, to name just a few. Computer-readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry. To provide for interaction with a user (with an I/O portion 524 of system 520 or the like), embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. Various features that are described in the context of a single embodiment can also be implemented in multiple embodiments separately or in any suitable subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and/or parallel processing may be advantageous. Moreover, the separation of various system components in the embodiments described above should not be understood as requiring such separation in all embodiments, and it should be understood that the described program components and systems can generally be integrated together in a single software and/or hardware product or packaged into multiple software and/or hardware products.

Note, in the following claims, an update buffer may contain nearly any information. The use of the term "update buffer" is considered general and not specific. Use of the term "update buffer" or "buffer" in this specification and the following claims is generally a specialization or example of the more general case covering nearly any data to be communicated from mutator to GC threads.

We claim:

1. A method of queuing buffers for processing by a garbage collector in a computer system, comprising:
running an application thread in memory of the computer system;
providing, for the application thread, a data structure including a current update buffer slot and a finished update buffer slot;
providing an update buffer in the memory for the application thread;
storing a pointer to the update buffer in the current update buffer slot;
storing null in the finished update buffer slot;
with the application thread, writing to the update buffer;
after the writing fills the update buffer to storage capacity, writing the pointer to the filled update buffer to the finished update buffer slot; and
with a garbage collector thread, inspecting the finished update buffer slot and claiming the filled update buffer for processing.

2. The method of claim 1, wherein the claiming is performed with an atomic operation and wherein the claiming further comprises changing the finished update buffer slot to null.

3. The method of claim 1, further comprising obtaining an empty update buffer and updating the current update buffer slot to have a pointer to the obtained, empty update buffer.

4. The method of claim 3, further comprising:
after the obtaining, filling the obtained, empty update buffer with data from the application thread; and
when the finished update buffer slot is determined to contain the pointer to the filled update buffer by the application thread, adding the obtained update buffer to a global queue of the computer system.

5. The method of claim 4, further comprising with a garbage collector thread determining the obtained update buffer is available in the global queue and, in response, claiming the obtained update buffer from the global queue with the garbage collector thread using an atomic operation.

6. The method of claim 4, further comprising, with the application thread, obtaining an additional, empty update buffer and writing a pointer to the additional, empty update buffer to the current update buffer slot.

7. A computer system adapted for low-contention update buffer queuing, comprising:
a processor running an operating system;
a run-time environment including a virtual machine provided on the operating system;
a garbage collector provided in the virtual machine including a plurality of garbage collector threads;
memory including a global queue; and
a plurality of application threads running in the memory, wherein each of the application threads is provided at least one update buffer and wherein the memory includes a thread data structure with a first slot storing a pointer to a current one of the update buffers and a second slot storing a pointer to a finished one of the update buffer,
wherein the second slot is initially set to null and when the application thread fills the current one of the update buffers, the application thread writes the pointer to the current one of the update buffers to the second slot, and
wherein the garbage collector threads function to periodically inspect the second slot of the thread data structures and, when the second slot contains the pointer to the current one of the update buffers, to claim the current one of the update buffers for processing.

8. The system of claim 7, wherein, after the pointer is written to the second slot, the application thread obtains an additional one of the update buffers and updates the pointer in the first slot to reference the additional one of the update buffers.

9. The system of claim 8, wherein the application thread fills the additional one of the update buffers and adds the additional one of the update buffers to the global queue.

10. The system of claim 9, wherein the garbage collector threads function to periodically inspect the global queue and, when the global queue contains the additional one of the update buffers, to claim the additional one of the update buffers for processing.

11. An update buffer queuing method, comprising:
providing a garbage collector thread in a run-time environment of a computer system;
with the garbage collector thread, inspecting a finished buffer slot of a plurality of thread data structures;
for each of the thread data structures, when a pointer to a thread update buffer is found, claiming the thread update buffer for processing with an atomic operation;
after the claiming, using the garbage collector thread to write null to the finished buffer slot;
running a plurality of application threads with each of the threads being associated with one of the thread data structures; and
with each of the application threads, writing one of the pointers in the finished buffer slot of the associated one of the thread data structures upon filling one of the thread update buffers.

12. The method of claim 11, further comprising operating one of the application threads to obtain a second thread update buffer, to fill the second thread update buffer, and to add the second filled thread update buffer when the finished buffer slot associated with the one of the application threads contains one of the pointers, adding the second filled thread update buffer to a global queue of the computer system.

13. The method of claim 12, with the garbage collector thread, determining the global queue contains the second filled thread update buffer and claiming the second filled thread update buffer for processing.

14. The method of claim 13, wherein the claiming of the second filled thread update buffer is performed with an atomic operation.

15. The method of claim 11, wherein the inspecting of the finished buffer slot of the thread data structures is initiated once per predefined time period.

16. The method of claim 11, wherein the inspecting of the finished buffer slot of the thread data structures is performed for a predefined subset of applications associated with the thread data structures.

* * * * *